United States Patent
Vazach et al.

(10) Patent No.: US 7,236,342 B2
(45) Date of Patent: Jun. 26, 2007

(54) IN-LINE PASSIVE BARRIER FOR INTRINSICALLY SAFE COMMUNICATION NETWORK

(75) Inventors: Joseph G. Vazach, Mentor, OH (US); Ulrich A. Behrens, Weinheim (DE); Guenter Gabriel, Obrigheim (DE); Robert J. Kretschmann, Bay Village, OH (US); Paraj Kayande, Calgary (CA); Robin David Slater, Dossenheim (DE)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 584 days.

(21) Appl. No.: 10/628,300

(22) Filed: Jul. 28, 2003

(65) Prior Publication Data

US 2005/0024160 A1 Feb. 3, 2005

(51) Int. Cl.
*H02H 1/00* (2006.01)
(52) U.S. Cl. .................................................. 361/119

(58) Field of Classification Search ................. 361/119
See application file for complete search history.

(56) References Cited

U.S. PATENT DOCUMENTS

| | | | | |
|---|---|---|---|---|
| 3,614,539 A | * | 10/1971 | Hallenbeck | 361/837 |
| 3,624,449 A | * | 11/1971 | Morgan | 361/55 |
| 5,835,534 A | * | 11/1998 | Kogure | 375/257 |
| 6,037,857 A | | 3/2000 | Behrens et al. | |
| 6,154,679 A | | 11/2000 | Kessler et al. | |
| 6,154,683 A | | 11/2000 | Kessler et al. | |
| 6,647,101 B2 | * | 11/2003 | Rahamim et al. | 379/93.05 |
| 6,980,174 B2 | * | 12/2005 | Flasza et al. | 343/850 |
| 7,075,414 B2 | * | 7/2006 | Giannini et al. | 340/310.11 |
| 2004/0127185 A1 | * | 7/2004 | Abrahams et al. | 455/277.1 |

* cited by examiner

*Primary Examiner*—Ronald W. Leja
(74) *Attorney, Agent, or Firm*—Keith M. Baxter; R. Scott Speroff

(57) ABSTRACT

A passive isolator may fit between two serial network cables to convert a standard serial network to a serial network suitable for use in hazardous environments.

14 Claims, 2 Drawing Sheets

IN-LINE PASSIVE BARRIER FOR INTRINSICALLY SAFE COMMUNICATION NETWORK

CROSS-REFERENCE TO RELATED APPLICATIONS

—

STATEMENT REGARDING FEDERALLY SPONSORED RESEARCH OR DEVELOPMENT

—

BACKGROUND OF THE INVENTION

The present invention relates to industrial control systems for use in explosive or other hazardous environments and in particular to a barrier for allowing a standard serial electrical network to pass between a hazardous and non-hazardous area.

Industrial controllers are special purpose computers used for controlling factory automation and the like. Under the direction of a stored program, a processor of the industrial controller examines a series of inputs reflecting the status of a controlled processor or device and changes outputs affecting control of the controlled process or device.

Generally industrial controllers are constructed in modular fashion to accommodate different applications requiring different numbers and types of input/output (I/O) circuits as is determined by the particular device or process being controlled. In such modular systems, a number of different functional modules connect together through a common backplane in a rack or the like to share data and power.

Often a controlled process may require control points (e.g., sensors or actuators) in an environment exposed to combustible vapors or airborne particles. In such hazardous environments, electrical arcing or excessive temperature in electrical equipment can cause an explosion. Electrical equipment intended for use in such hazardous environments must conform to certain safety standards intended to reduce the chance or effect of an explosion. Under such standards, the equipment may be placed in a special housing that is flameproof or explosion-proof. The housing may be charged with an inert gas to prevent the infusion of explosive fumes.

Other methods of protection are also available for use in hazardous environments including the method of intrinsic safety. Equipment designed to be "intrinsically safe" generally limits the electrical energy used by the equipment to a low level to avoid the occurrence of sparks with sufficient energy to ignite a flammable atmosphere during a fault condition, and to avoid surface temperatures above those needed to cause spontaneous ignition. Fault conditions must be considered as well as the energy storage characteristics of the components of the equipment.

A number of agencies certify equipment to an intrinsic safety standard. See generally, Underwriter's Laboratories document UL-913,1988, Intrinsically Safe Apparatus And Associated Apparatus For Use In Class I, II, and III, Division I, Hazardous (Classified) Locations. See also, National Electrical Code Handbook, 1993, Article 500, Hazardous (Classify) Locations, Article 504, Intrinsically Safe Systems, Article 505, Class I, Zone 0, 1 and 2 Locations. See also, FM Cl. No. 3600, March 1989, Electrical Equipment for Use in Hazardous (Classified) Locations General Requirements and Cl. No. 3610, October 1988, Intrinsically Safe Apparatus and Associated Apparatus for Use in Class I, II, III, Division 1 Hazardous (Classified) Locations. See also, EN50014: 1992, Electrical Apparatus for Potentially Explosive Atmospheres, EN50020:1994, Electrical Apparatus for Potentially Explosive Atmospheres—Intrinsic Safety 'i' and EN50039: 1980, Electrical Apparatus for Potentially Explosive Atmospheres—Intrinsically Safe Electrical Systems 'i'. These documents are hereby incorporated by reference.

The terms "intrinsic safety" and "intrinsically safe" as used herein do not indicate that the equipment presents no danger or that it meets the above standards but only that it is designed to permit use in some hazardous environments without additional precautions such as explosion-proof casings and the like.

In a typical control system where a portion of the controlled process is in a hazardous area, the industrial controller will be placed a distance away in a "safe" or non-hazardous area free from combustible gases or other combustible elements. Input and output signals to and from the hazardous area are carried by cables leading from the industrial control system to the respective portion of the controlled process. Cables passing into the hazardous area from the non-hazardous area, even for low power components, must first pass through barrier circuits or isolating circuits.

Barrier circuits shunt hazardous energy to special safety ground connections. In a typical barrier circuit, electrical power passing from the non-hazardous area to the hazardous area will pass through a fuse to the cathodes of one or more voltage limiting zener diodes having their anodes connected to ground. High voltages are thus shunted safely to ground. Current into the hazardous area is limited by a resistor positioned after the voltage limiting zener diodes.

Isolating circuits work by separating the two halves of a conductor so there is no direct current path for any hazardous energy from the non-hazardous side to the hazardous area. A typical isolator may use transformers, capacitors, or optical-type isolators as its means of separating two halves of a conductor.

When there are many points of control in a hazardous area, the cost to the control system may be substantial driven by the cost of many barriers or isolation circuits for each control point and the long runs of wiring.

For this reason, it is known to place intrinsically safe I/O circuits in the hazardous area and to communicate with them via a single serial network eliminating the need to pass many conductors into the hazardous area, each with a separate barrier. Isolating a serial network has been handled in two principal ways. The first employs a length of fiber optic cable between fiber end or repeater node. A standard end or repeater node may be used outside of the hazardous area and a special intrinsically safe hub used inside the hazardous area. This approach can be quite costly.

Alternatively, U.S. Pat. No. 6,037,857 describes a module being part of the industrial control system in the non-hazardous areal. This module receives a source of intrinsically safe power to actively create an intrinsically safe serial network signal that may pass directly into the hazardous area on a standard communications cable.

SUMMARY OF THE INVENTION

The present inventors have developed a passive, in-line barrier for high-speed serial networks greatly simplifying the task of communicating between hazardous and non-hazardous areas by eliminating the need for an intrinsically safe power source and a specialized controller module and a corresponding slot in a controller. The barrier may be easily installed anywhere between standard co-axial cables and is compact and relatively inexpensive.

Specifically, the present invention provides a barrier for high speed serial networks comprising a housing having a first terminal set receiving a first conductor pair from non-intrinsically safe network and a second terminal set for receiving a second conductor pair from an intrinsically safe network. The housing further contains a fusible link having a first end joined through the first terminal set to a first conductor of the first conductor pair and a bi-polar voltage sensitive conductor shunting a second end of the fusible link and a second conductor of the first conductor pair. A matching network in series between the first and second terminal sets substantially matches the impendence of the barrier at the first and second terminal sets to media of the non-intrinsically safe network and intrinsically safe network, respectively.

Thus it is one object of the invention to provide a simple method of converting a non-intrinsically safe serial network into an intrinsically safe network without the need for a ready source of intrinsically safe power.

The barrier may further include a current limiting element in series between a second end of the fusible link and a first conductor of the second conductor pair.

It is thus another object of the invention to insure intrinsically safe operation of a standard serial network by controlling power transferred through the network media.

The bipolar voltage sensitive conductor may provide a shunt path for voltages in excess of 5.0 volts.

Thus it is another object of the invention to prevent the communication of high voltages through the network media from the non-hazardous area to the hazardous area.

The bipolar voltage sensitive conductor may be a parallel combination of back-to-back zener diodes.

Thus it is another object of the invention to provide protection against high voltages in either of two polarities.

Each zener diode may be series connected with a standard diode facing the opposite direction as the zener diode. These diodes provide for the required buffering of the high zener diode capacitance. This capacitive effect would be very detrimental for a high speed network.

Thus it is another object of the invention to use standard zener diodes for bipolar protection.

The bipolar voltage sensitive conductor may be a parallel combination of at least four conductive elements, each being series connected zener diodes and an opposed standard diode where at least one conductive element is connected to conduct current in the opposite direction of another conductive element.

Thus it is another object of the invention to provide redundant voltage limiting devices to reduce the risk of incapacitating failure.

The junction of the zener diodes and the standard diodes of conductive elements of the same direction may be joined.

It is thus another object of the invention to decorrelate failure of the zener and standard diodes.

The isolator may further include a DC blocking element in series between a second end of the fuse and a first conductor of the second conductor pair.

Thus it is another object of the invention to eliminate direct flow of current from the non-hazardous to the hazardous side such as would create unbounded energy transfer.

The blocking element may be a capacitor.

Thus it is another object of the invention to provide a lightweight and simple DC blocking element.

The blocking element may be at least two series capacitors.

Thus it is another object of the invention to provided redundancy against the possibility of a capacitor shorting.

The networks may use coaxial cable and the terminals may be BNC-type connectors held at opposite ends of the housing.

Thus it is another object of the invention to provide an extremely simple inline barrier whose presence may be readily observed.

One end of the insulator may be marked with indicia to indicate which side should connect to the intrinsically safe network.

Thus it is another object of the invention to provide a barrier that may be readily installed in the proper orientation.

The housing of the barrier may include a third terminal set receiving a third conductor pair from a redundant non-intrinsically safe network and a fourth terminal set for receiving a fourth conductor pair from a redundant intrinsically safe network. A second fusible link may have a first end joined through the third terminal set to a first conductor of the third conductor pair and a second bi-polar voltage sensitive conductor may shunt a second end of the fusible link and a second conductor of the third conductor pair. A second matching network in series between the third and fourth terminal sets to substantially match the impendence of the barrier at the third and fourth terminal sets to media of the redundant non-intrinsically safe network and redundant intrinsically safe network, respectively.

These particular objects and advantages may apply to only some embodiments falling within the claims and thus do not define the scope of the invention.

DETAILED DESCRIPTION OF THE PREFERRED EMBODIMENT

Figure 1:
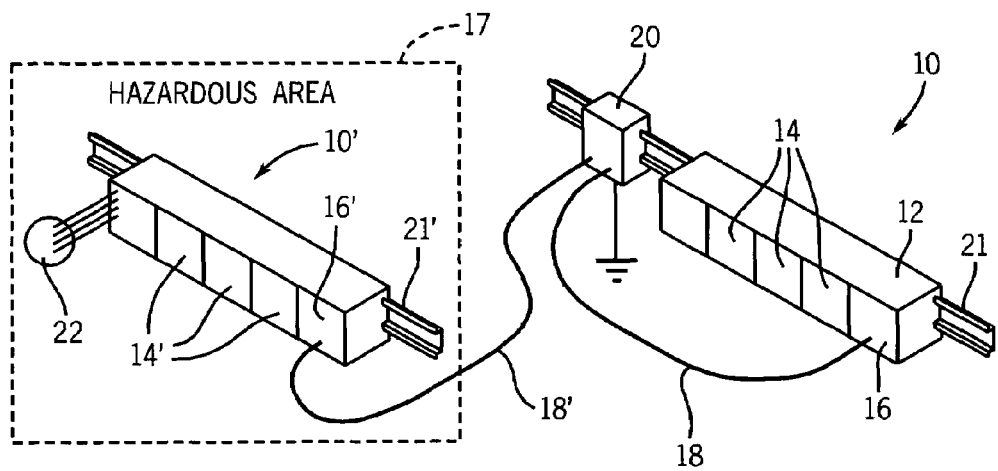
FIG. 1 is a perspective view of a controller system employing the present invention to communicate serial data from a first controller to I/O points located within a hazardous area.

Referring now to FIG. 1, a standard industrial control 10, typically not conforming to intrinsically safe standards, may provide a rack 12 holding a plurality of control modules 14 of types well known in the art. One control module 14 may be a serial communication module 16 allowing communication of data over a standard portion 18 of a high speed serial network such as ControlNet, Ethernet, or the like.

The rack 12 may be supported on a DIN rail 21 also supporting a network barrier 20 of the present invention. Cabling for the standard portion 18 of the network may connect to one side of network barrier 20 which may, in turn, connect to cabling for an intrinsically safe portion 18' of the network leading to a hazardous area 17. Generally, the intrinsically safe portion 18' of the network will use the same protocol as the standard portion 18 of the network but will be controlled in power level and spectrum, as will be described, to reduce the possibility of creating an ignition hazard within the hazardous area 17.

The intrinsically safe portion 18' of the network may connect to a network card 16' of an intrinsically safe rack 12' in a hazardous area 17. The intrinsically safe rack 12' may also hold I/O modules 14' which may receive input signals from controlled equipment 22 in the hazardous area 17 and provide output signals to that equipment 22 as is well understood in the art. Construction of the rack 12' and modules 14' is described in U.S. Pat. No. 6,154,683 issued Nov. 28, 2000 assigned to the assignee of the present invention and hereby incorporated by reference.

Figure 2:
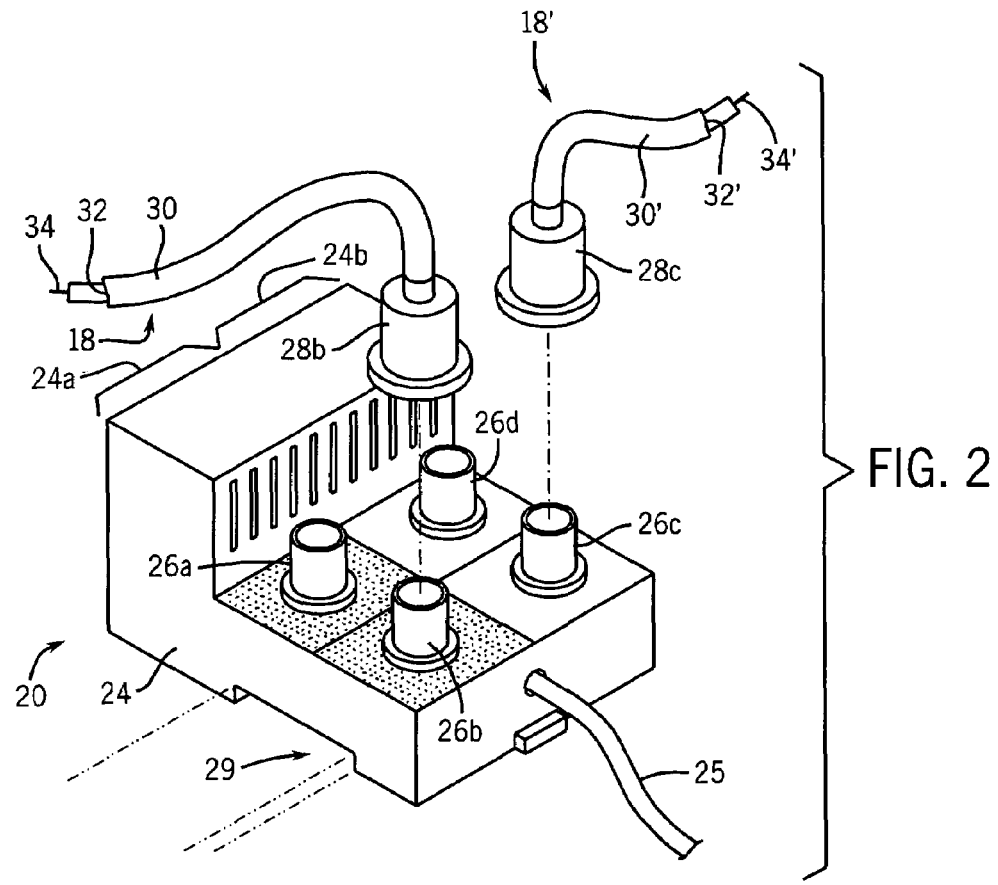
FIG. 2 is a perspective view of the barrier of the present invention providing for isolation between standard and intrinsically safe portions of a redundant serial network.

Referring now to FIG. 2, the network barrier 20 may have a housing 24 constructed of an electrically insulating material, and supporting on its front face, four BNC-type connector plugs 26a–26d. Connector plugs 26a and 26b are arranged on a first half 24a of the housing 24 (which is divided along a vertical line of symmetry) in opposition to connector plugs 26d and 26c, respectively, which are arranged on a second half 24b of the housing 24. A portion of the housing 24 under the connector plugs 26a and 26b is gray denoting that the connectors 26a and 26b are to be connected to the standard portion 18 of the network whereas a portion of the housing 24 under the connector plugs 26d and 26c is blue denoting that the connectors 26d and 26c are to be connected to the intrinsically safe portion 18' of the network.

Connector plugs 26a and 26d provide terminals for one barrier circuit and connector plugs 26b and 26c provide terminals for a second barrier circuit independent for the first. The two barrier circuits allow for isolation of a redundant cabling for the network. For simplicity, one barrier circuit and its connection to the network will now be described, it being understood that the other barrier circuit and network connection is substantially identical.

Connector 26b may join with coaxial cable 30 forming the media of the standard portion 18 of the network via BNC-type socket 28b. Socket 26c provides similar connection coaxial cable 30' forming the media of the intrinsically safe portion 18' of the network via BNC-type socket 28c. As is understood in the art, the outer portions of sockets 28b and 28c are metallic and electrically joined to a shield 32 and 32' of the cable 30 and 30', respectively. The shields 32 and 32' in turn are in a coaxial position around a center conductor 34 and 34' of the cable 30 and 30', respectively. The sockets 26b and 26c are separated sufficiently so that there is little risk that the connectors 28b and 28c might inadvertently be shorted together.

The housing 24 includes a slot 29 for receiving the DIN rail 21 and provides a safety ground lead 25 that is attached to a safety ground, being a ground point reference to an earth ground as defined by intrinsically safe standards.

Figure 3:
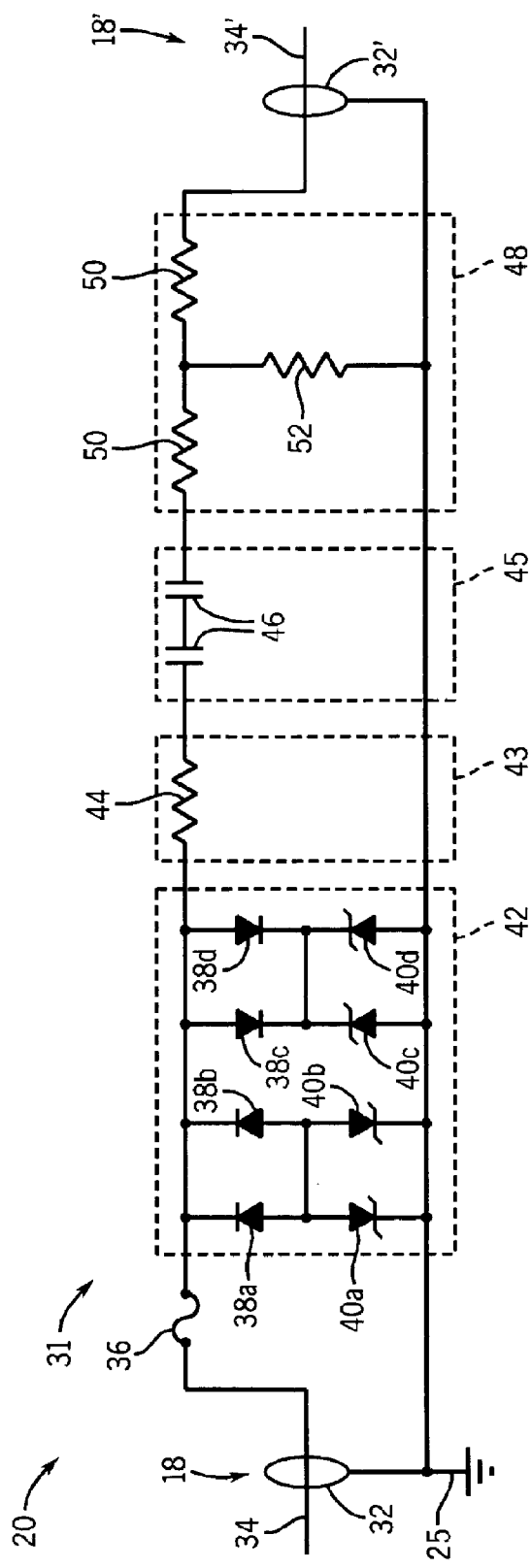
FIG. 3 is a schematic diagram of one half of the circuitry of the barrier of FIG. 2.

Referring now to FIG. 3, the conductor 34 of cable 30, the standard portion 18 of the network, is received barrier circuitry 31 held within the housing 24 and specifically by one terminal of a fuse 36 providing a maximum current limit of approximately 63 mA. The second terminal of the fusible element 36 is received by the cathode of diodes 38a and 38b and the anode of diodes 38c and 38d. The anodes of diodes 38a and 38b are joined together and in turn, also connect to the anodes of zener diodes 40a and 40b, while the cathodes of zener diodes 40a and 40b are connected to shield 32, which is joined by a separate conductor to shield 32' and also to the safety ground lead 25.

Similarly, cathodes of diodes 38c and 38d are joined together and also connected to the cathodes of zener diodes 40c and 40d. The anodes of zener diodes 40c and 40d are connected again to shields 32' and safety ground lead 25.

The second terminal of the fuse 36 communicates (via other elements to be described) with conductor 34' hence together diodes 38a–38d and zener diodes 40a–40d comprise a bipolar voltage limiting conductor 42 triggering at the zener diode voltage of 5.6 V plus the forward drop voltage of diodes 38 to short conductors 34 to ground for voltages over approximately 5 volts (6.3 V in the preferred embodiment) in either of two polarities thereby limiting transmission of high voltages from the standard portion 18 of the network to the intrinsically safe portion 18' of the network. Diodes 38a–38d are used to compensate or buffer the capacitance of the zener diodes 40a–40d from appearing in parallel with the transmission line formed by conductors 34-34' and 32-32'. Proper selection of these are critical to proper high speed performance of the transmission line.

This conduction of the diodes 38a–38d and zener diodes 40a–40d forms a crowbar circuit with fuse 36 to hasten the opening of fuse 36 under sustained high voltage conditions. Under brief duration high voltage conditions, the shunting is sufficient together with the natural inductance of the cable 30 to prevent further transmission of the high-voltage pulses through to conductors 34' without opening the fuse 36.

A current limiting resistor 44 is connected in series between the second terminal of fuse 36 and with the conductor 34 provides a current limiting element 43 to limit the current flow passing through the barrier circuit 31.

Two series connected capacitors 46 (also connected in series with the resistor 44 between the second terminal of fuse 36 and with the conductor 34) form a direct current blocking element 45 blocking direct current flowing between conductor 34 and 34'. Redundant capacitors 46 are used so that an internal short in either capacitor 46 will not cause a loss of DC blocking.

An impedance matching element 48 (also connected in series with the resistor 44 and capacitors 46 between the second terminal of fuse 36 and with the conductor 34) provide a matching between the impedance of the barrier circuitry 31 as seen at the connectors 26b and 26c equal to the characteristic impedance of the cables 30 and 30' to which they connect. The impendence-matching element 48 compensates for the resistance of the fuse 36 and resistor 44 to maximize energy transfer through the barrier circuitry 31 eliminating the need for active circuitry to boost the signal through the barrier circuitry 31. The impedance matching element 48 in the preferred embodiment is a simple T network having two series connected resistors 50 (generally in series between conductors 34 and conductors 34') and shunting resistor 52 leading from the junction of resistors 50 to the shield 32, 32', and safety ground lead 25.

It is specifically intended that the present invention not be limited to the embodiments and illustrations contained herein, but include modified forms of those embodiments including portions of the embodiments and combinations of elements of different embodiments as come within the scope of the following claims. In the claims, per common usage, the statement that a particular circuit element is connected in "series" between two points does not preclude other components also being in series with the particular circuit element between the two points, including previously recited elements, and does not require that the particular circuit element be directly attached to either or both of the two points between which it is in series.

We claim:

1. An in-line passive isolation barrier for megahertz serial digital data communication networks comprising:
   a housing having a first terminal set receiving a first conductor pair from non-intrinsically safe network and a second terminal set for receiving a second conductor pair from an intrinsically safe network, the housing further containing:

a DC blocking element in series between the first and second terminal sets;

a fusible link having a first end joined through the first terminal set to a first conductor of the first conductor pair;

a bi-polar voltage sensitive conductor shunting a second end of the fusible link and a second conductor of the first conductor pair at substantially equal positive and negative voltages; and a matching network in series between the first and second terminal sets to substantially match the impendence of the barrier at the first and second terminal sets to media of the non-intrinsically safe network and intrinsically safe network, respectively.

2. The in-line passive isolation barrier of claim 1 further including a current limiting element in series between the first and second terminal sets.

3. The in-line passive isolation barrier of claim 2 wherein the current limiting element is a resistor.

4. The in-line passive isolation barrier of claim 1 wherein the bipolar voltage sensitive conductor provides a shunt path for a voltage signal greater than 5 volts.

5. The in-line passive isolation barrier of claim 1 wherein the bipolar voltage sensitive conductor is a parallel combination of Zener diodes facing in opposite directions.

6. The in-line passive isolation barrier of claim 5 wherein each Zener diode is series connected with a standard diode facing the opposite direction as the Zener diode.

7. The in-line passive isolation barrier of claim 1 wherein the bipolar voltage sensitive conductor is the parallel combination of at least four conductive elements each being a series connected Zener diode and opposed standard diode, at least one conductive element connected to conduct current in the opposite direction of another conductive element.

8. The in-line passive isolation barrier of claim 7 wherein the junction of the Zener diodes and the standard diodes of conductive elements of the same polarity are joined.

9. The in-line passive isolation barrier of claim 1 wherein the DC blocking element is a capacitor.

10. The in-line passive isolation barrier of claim 1 is at least two series connected capacitors.

11. The in-line passive isolation barrier of claim 1 wherein the network medium is coaxial cable and the terminals are BNC-type connectors.

12. The in-line passive isolation barrier of claim 1 wherein the terminal sets are held at opposite ends of the housing.

13. The in-line passive isolation barrier of claim 1 wherein the housing has external indicia indicating which of the terminal sets is attached to the intrinsically safe network.

14. The in-line passive isolation barrier of claim 1 wherein the housing further includes:

a third terminal set receiving a third conductor pair from a redundant nonintrinsically safe network and a fourth terminal set for receiving a fourth conductor pair from a redundant intrinsically safe network;

a second fusible link having a first end joined through the third terminal set to a first conductor of the third conductor pair;

a second bi-polar voltage sensitive conductor shunting a second end of the fusible link and a second conductor of the third conductor pair; and a second matching network in series between the third and fourth terminal sets to substantially match the impendence of the barrier at the third and fourth terminal sets to media of the redundant non-intrinsically safe network and redundant intrinsically safe network, respectively.

* * * * *